May 19, 1925.
J. RANZ
DISPLAY DEVICE FOR AUTOMOBILES
Filed April 5, 1924
1,537,965
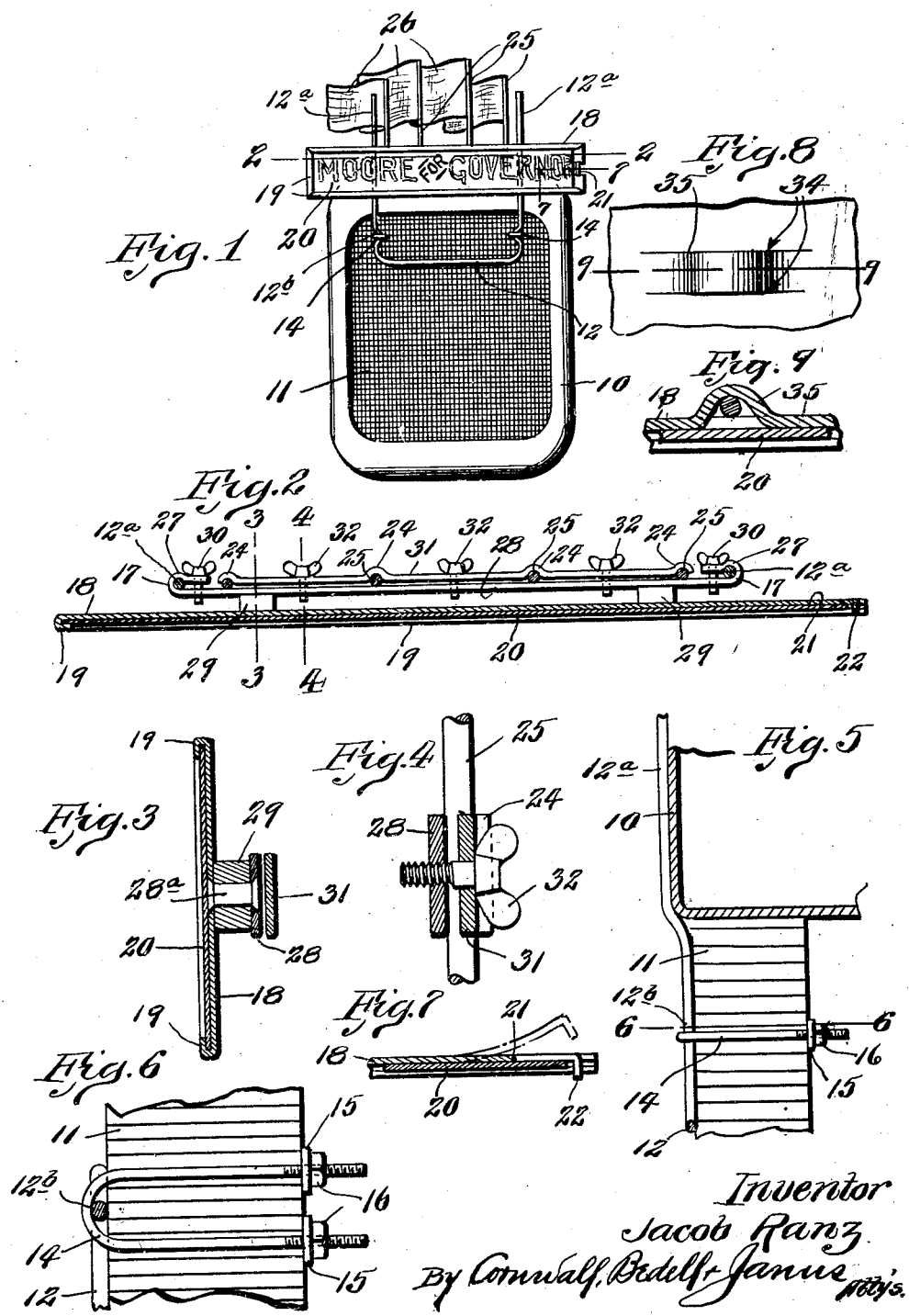

Patented May 19, 1925.

1,537,965

UNITED STATES PATENT OFFICE.

JACOB RANZ, OF ST. LOUIS, MISSOURI.

DISPLAY DEVICE FOR AUTOMOBILES.

Application filed April 5, 1924. Serial No. 704,500.

*To all whom it may concern:*

Be it known that I, JACOB RANZ, a citizen of the United States, residing at St. Louis, Missouri, have invented a certain new and useful Improvement in Display Devices for Automobiles, of which the following is a specification, such as will enable others skilled in the art to which it appertains to make and use the same.

This invention relates to new and useful improvements in display devices for automobiles and the objects of the invention are to provide a display device which can be easily attached to and detached from an automobile, which is light in weight, and is of strong construction and can be manufactured at low cost.

Further objects of the invention are to provide a display device and a support therefor, which device can be adjusted in vertical plane on said support and does not obstruct the driver's view and does not hinder the access to any part of the automobile.

Still further objects of the invention are the provision of an improved display card holder having suitable means for receiving and engaging the staffs of flags or display banners so that the latter are supported and displayed in combination with the sign or card in said holder.

With these and other objects in view my invention consists in certain novel features of construction and arrangement of parts, hereinafter more fully described and claimed, and illustrated in the accompanying drawings, in which—

Figure 1 is a front elevational view of an automobile radiator with my improved display device in position thereon.

Figure 2 is a horizontal section taken on line 2—2 of Figure 1.

Figure 3 is a vertical section taken on line 3—3 of Figure 2.

Figure 4 is a vertical section taken on line 4—4 of Figure 2.

Figure 5 is a vertical section through the radiator showing the means for attaching the support thereto.

Figure 6 is a horizontal cross section taken on line 6—6 of Figure 5.

Figure 7 is a detail cross section taken on line 7—7 of Figure 1.

Figure 8 is a fragmental rear view of a modified form of a holder.

Figure 9 is a horizontal cross section taken on line 9—9 of Figure 8.

The present invention is particularly adapted to be used in connection with the radiator of an automobile and is designed to be secured in position without the necessity of perforating or otherwise mutilating the automobile by utilizing attaching means which can be easily secured to the core section of the radiator.

Referring by numerals to the accompanying drawings, 10 indicates the radiator of an automobile having the usual core section 11. A U-shaped member 12 preferably made of heavy wire is secured in position on the radiator by means of U-shaped members 14 which straddle each leg of member 12 and extend rearwardly through the openings in the core section 11. The ends of members 14 are threaded and receive washers 15 and nuts 16, which latter when tightened, securely hold member 14 to the core section and thereby clamp member 12 in position. The legs 12$^a$ of member 12 project upwardly a suitable distance and are adapted to receive socket members 17 which project rearwardly from display holder 18. This holder is preferably formed of sheet metal and has its top and bottom edges and one end edge turned inwardly to form channels 19 for receiving the edges of a display card 20. The opposite end of this holder is left open to permit the insertion of the card.

A longitudinally disposed tongue 21 is struck from the rear wall of the holder and has its outer rear free end 22 turned outwardly and forwardly so as to lie in the path of the card and prevent the displacement of same from the holder. This tongue is yieldable and may be pressed rearwardly so as to move the flange 22 rearwardly out of the path of card 20 whereby the latter may be inserted in and withdrawn from the holder. When tongue 21 is released, it assumes its normal position and closes the open end of holder 18. Socket members 17 are arranged on holder 18 near the ends thereof.

A plurality of socket members 24 project rearwardly from holder 18 and are preferably spaced intermediate socket members 17. These members 24 are designed to receive the staffs 25 of flags or banners 26, which latter are disposed above holder 18 and form a decorative or distinct setting for the card or poster carried by the holder.

In the preferred form shown in Figures 1 to 7 inclusive, socket members 17 are formed by rebending the ends 27 of a bar 28, which latter is secured to holder 18 by pins or rivets 28ᵃ and is spaced therefrom by washers 29 arranged on said rivets. Suitable thumb screws 30 are in threaded engagement with bar 28 and pass through apertures formed in the ends 27 so that when said screws are tightened, socket members 17 grip the legs 12ᵃ of support 12 and lock holder 18 in position. When it is desired to adjust said holder, screws 30 are loosened so as to permit bar 28 to slide on legs 12ᵃ. Socket members 24 are preferably formed or pressed out in a bar 31 which is secured to bar 28 by means of thumb screws 32. These screws pass through apertures formed in bar 31 and have threaded engagement with bar 28 so that by tightening said screws, the staffs 25 of flags 26 are clamped between bars 28 and 31.

In order to prevent displacement of support 12 with regard to attaching members 14, the legs 12ᵃ are provided with laterally disposed jogs or bends 12ᵇ and the shoulders thus formed engage members 14 and prevent accidental vertical movement of support 12.

In the modified form shown in Figures 8 and 9 the socket or receiving members are formed by making longitudinal cuts 34 in the rear wall of the holder and then pressing out the central portion 35 as shown in Figure 9. Sockets thus formed frictionally engage the legs 12ᵃ or staffs of the flags as the case may be and prevent the displacement of the associated parts.

A display device of my improved construction is very simple, can be easily attached in position, and does not detract from the appearance of the automobile.

I claim:

1. A display device for automobiles comprising a support adapted to be secured to a part of an automobile, said support being provided with upwardly presented extensions, a display holder, and clamping members secured to said holder and adapted to engage said extensions and support said holder.

2. A display device for automobiles comprising a support adapted to be secured to a part of an automobile, said support being provided with upwardly presented extensions, a display holder, clamping members secured to said holder and adapted to engage said extensions and support said holder, and members for locking said clamping members to said extensions.

3. A display device for automobiles comprising a support adapted to be secured to a part of an automobile, said supports being provided with upwardly presented extensions, a sign holder, clamping members carried by said holder and adapted to engage said extensions and support said holder, and socket members cooperating with said clamping members and adapted to receive and support the staffs of flags or banners.

4. A display device for automobiles comprising a U-shaped support, attaching members engaging the cellular part of the automobile radiator for securing said support in position, and a sign holder disposed in front of said support and having seats for receiving and engaging the parallel portions thereof.

5. A display device for automobiles comprising a U-shaped support, attaching members for securing said support to the core section of the radiator of an automobile, a sign holder disposed forwardly of the parallel portions of said support and having seats for operatively engaging the parallel portions, and socket members arranged on said holder and adapted to receive and support the staffs of display posters or banners.

6. A display device for automobiles comprising a U-shaped support, the parallel portions of which are provided in their length with shoulders, attaching members adapted to be projected through the core section of an automobile, each of said members being provided at one end with a hooked portion for engaging the shouldered portion of the support and having its opposite end threaded, and means for engaging said threaded end and securing said clamping member to said core section.

7. In a display device for automobiles, the combination of a support adapted to be secured to an automobile part and having parallel vertically disposed extensions, and a horizontally disposed display sign holder arranged in front of said extension and having rearwardly extending seats for adjustably engaging said extensions.

8. In a display device for automobiles, a support having parallel extensions, a display sign holder, a bar secured to and disposed rearwardly of said holder and provided with seats for engaging said extensions, and screws in said bar for holding said extensions to their seats.

9. In a display device for automobiles, a support adapted to be secured to a part of an automobile, said support having parallel extensions, a display sign holder, a bar carried by said holder and provided with seats for operatively engaging said extensions, and a clamping bar cooperating with the first-mentioned bar and having seats for operatively engaging the staffs of display banners or flags.

10. In a display device for automobiles, a support adapted to be secured to a part of an automobile, said support having parallel extensions, a display sign holder, a bar carried by said holder and provided with seats for operatively engaging said extensions, a clamping bar cooperating with the first-mentioned bar and having seats for operatively engaging the staffs of display banners or flags, and screws for interengaging said bars and locking the staffs to their seats.

11. In a display holder for automobiles, the combination of a support adapted to be secured to a part of an automobile, said support being provided with vertically disposed parallel extensions, a horizontally disposed holder arranged in front of and transversely of said extensions, said holder being adapted to receive a display sign, and means on said holder for engaging said extensions and supporting said holder in position thereon.

In testimony whereof I hereunto affix my signature this 11th day of March, 1924.

JACOB RANZ.